United States Patent [19]

Wilson

[11] 4,283,992
[45] Aug. 18, 1981

[54] SERVO BOOSTERS

[75] Inventor: Alexander J. Wilson, Sutton Coldfield, England

[73] Assignee: Girling Limited, Birmingham, England

[21] Appl. No.: 25,064

[22] Filed: Mar. 29, 1979

[30] Foreign Application Priority Data

Apr. 8, 1978 [GB] United Kingdom ............... 13873/78

[51] Int. Cl.³ .......................... F15B 9/10; F15B 13/10
[52] U.S. Cl. ................................. 91/369 B; 91/391 R; 92/140
[58] Field of Search ............. 91/369 B, 369 R, 391 R, 91/391 A, 376 R; 92/140

[56] References Cited
U.S. PATENT DOCUMENTS

| | | | |
|---|---|---|---|
| 2,134,227 | 10/1938 | Forkardt | 92/140 |
| 2,395,223 | 2/1946 | Ingres | 92/140 |
| 4,086,842 | 5/1978 | Kytta | 91/391 R |

Primary Examiner—Paul E. Maslousky
Attorney, Agent, or Firm—Scrivener, Clarke, Scrivener and Johnson

[57] ABSTRACT

A vehicle brake system in which an output member is axially displaceable by the application of differential fluid pressure, under the control of a valve operable by an input member, across a movable internal wall which divides a housing of the booster into a pair of fluid chambers. Displacement of the movable wall is communicated to the output member via a lever mechanism providing a mechanical advantage between said movable wall and the output member. The lever mechanism comprises first and second levers. The second lever is pivotable relative to the input and output members at respective pivot points. The first lever is pivoted to the second lever, with the movable wall acting on one end of said first lever and the other end thereof co-operating with the housing such that, upon a predetermined displacement of the movable wall, the first lever is pivoted and its displacement is transmitted with mechanical advantage to the output member via the second lever, the second lever simultaneously transmitting a reaction force to the input member.

10 Claims, 8 Drawing Figures

SERVO BOOSTERS

The present invention is concerned with servo boosters, particularly for the braking systems of motor vehicles.

Present day practice in the manufacture of servo boosters provides three alternative solutions to the problem of achieving sufficiently high output loads for given input (pedal) loads. Firstly, the servo body is made large in diameter so that a movable wall having a large area may be used, resulting in a greater effective thrust for a given pressure differential.

The second solution is used where the installation restricts the space available for siting the servo. Under such restrictive conditions, the large diameter servo cannot be used, and in order to provide sufficient "movable wall" area, a tandem servo is used, which incorporates two movable walls of relatively small diameter mounted in a common housing. However, this solution incurs the penalty of extra length.

The third solution involves the provision of a lever mechanism which communicates the displacement of the movable wall to the output member with a mechanical advantage. This is accomplished (see for example U.S. Pat. No. 4,086,842) by the provision of one or more levers each of whose one end engages the movable wall and whose other end engages a part fixed relative to the booster housing, the or each lever being pivotably coupled to the output member at a location intermediate its ends. The arrangement is such that displacement of said one end of the or each lever upon movement of the wall causes the lever to be pivoted about its other end engaging the housing so as to displace the output member in accordance with the lever ratio thereby obtained.

It is also known that it is advantageous to feed at least part of the boosted output back to the input member as a "reaction" force which provides the operator with the "feel" of the brakes. A conventional manner of achieving such feed back reaction is to use a further lever mechanism connected between the output member or movable wall and the input member. An example of this known type of lever reaction mechanism is shown in U.K. Pat. Specification No. 1,363,243.

It is an objective of the present invention to provide a brake booster which combines the use of such an output boosting lever mechanism and a reaction lever mechanism in a simple manner requiring a minimum number of components and enabling advantageous operating characteristics to be attained.

In accordance with the present invention, there is provided a vehicle brake system in which an output member is axially displaceable by the application of differential fluid pressure, under the control of a valve operable by an input member, across a movable internal wall dividing a housing of the booster into a pair of fluid chambers, displacement of the movable wall being communicated to the output member via a lever mechanism providing a mechanical advantage between said movable wall and the output member, said lever mechanism comprising at least one first lever and at least one second lever, the second lever being pivotable relative to the input and output members at respective pivot points and the first lever being pivoted to the second lever, with the movable wall acting on one end of said first lever and the other end thereof cooperating with the housing, or a part fixed thereto, such that, upon a predetermined displacement of the movable wall, the first lever is pivoted and its displacement is transmitted with mechanical advantage to the output member via the second lever, the second lever simultaneously transmitting a reaction force to the input member.

The invention is described further hereinafter, by way of example, with reference to the accompanying drawings in which.

Figure 6:
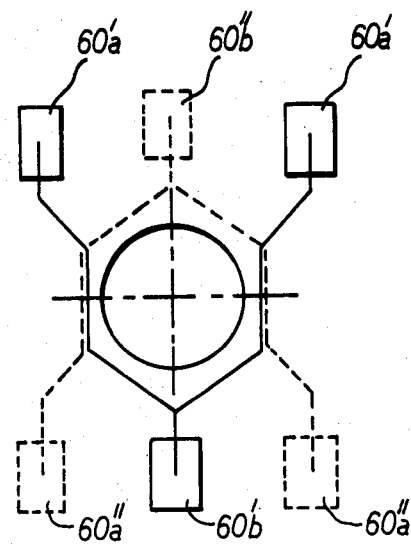
Figure 7:
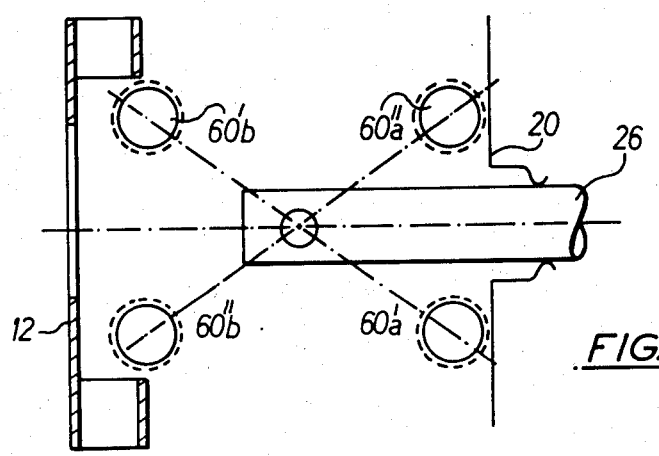

FIGS. 6 and 7 diagrammatically illustrate the use of Y-shaped levers carrying three rollers.

The illustrated servo booster comprises a housing 10 formed by a pair of shells 12,14 which are joined together at their peripheries in an air tight manner with a peripheral bead portion 16 of a flexible rolling diaphragm 18 clamped therebetween. The diaphragm 18 forms part of an annular movable wall assembly which also includes a generally annular piston 20 and which divides the interior of the housing 10 into two working chambers 22,24, referred to hereinafter as the forward and rearward chambers, respectively. Slidably and sealingly received in the central aperture of the annular piston 20 and a coaxial aperture in the rearward end of the housing shell 14, is a hollow cylindrical guide tube 26. Thus, the guide tube 26 is slidable relative to the housing 10 and the piston 20 is slidable on the guide tube. The inner end of the guide tube 26 located within the housing chamber 22 is rigidly connected to an output rod 28 which slidably and sealingly extends through a central aperture 30 in the housing shell 12. An input rod 32, adapted to be actuated in use by a foot pedal (not shown), is attached to a hollow generally cylindrical input piston 34 which is slidably and sealingly received within the hollow guide tube 26.

Figure 1:
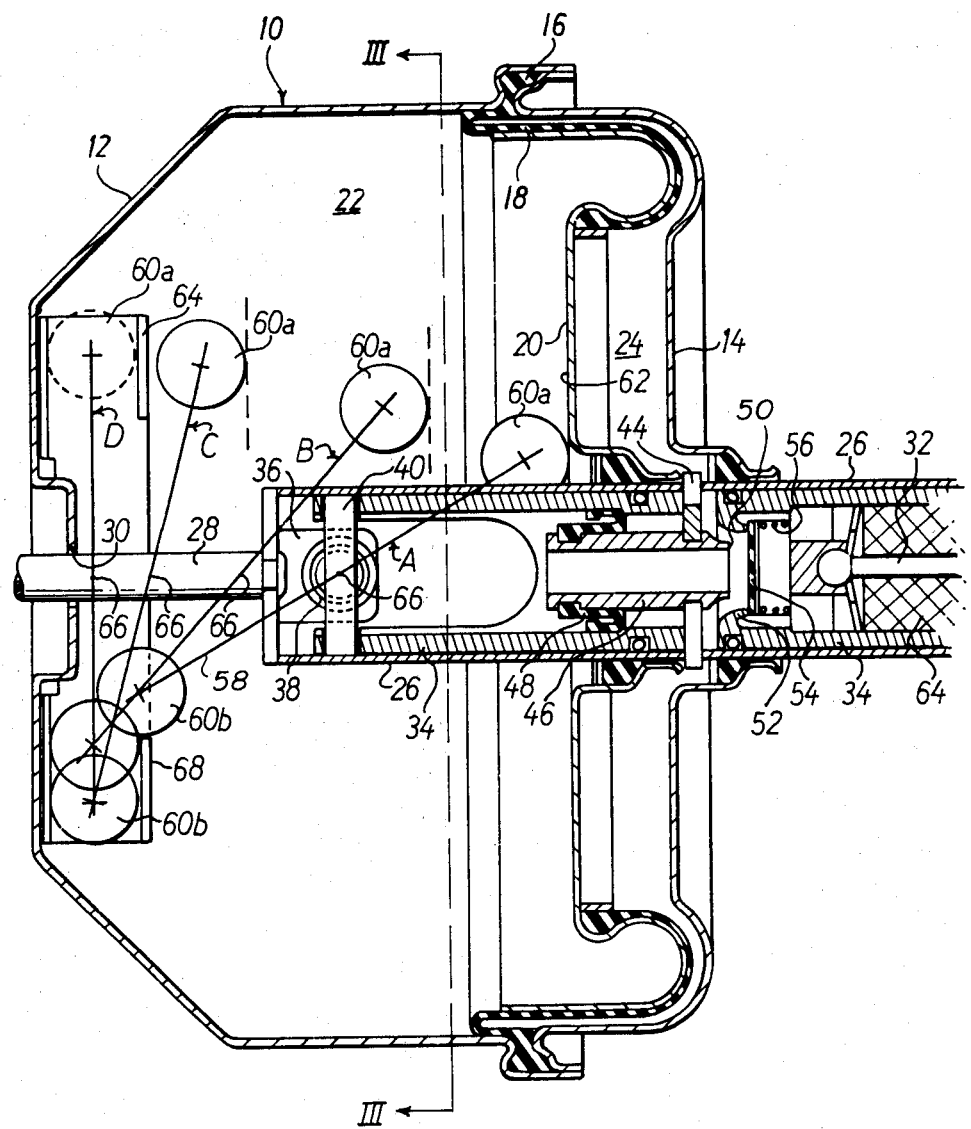
FIG. 1 is a diagrammatic sectional side elevation of one embodiment of a servo booster in accordance with the present invention.
Figure 2A:
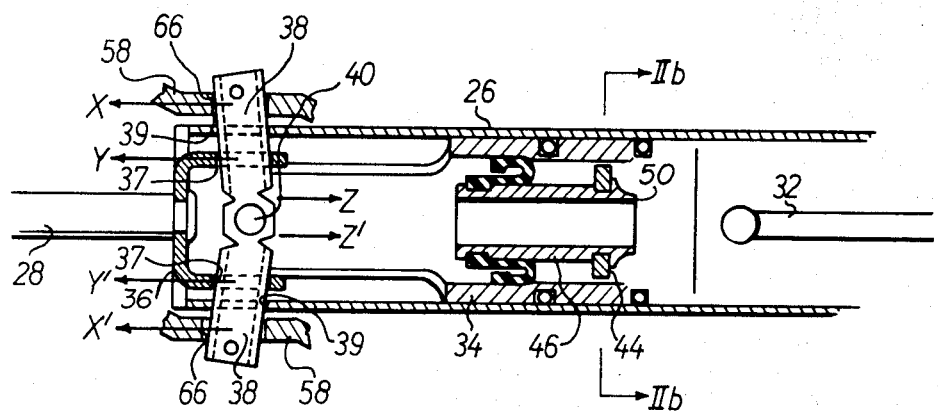
FIG. 2a is a diagrammatic plan view of part of the embodiment of FIG. 1.
Figure 2B:
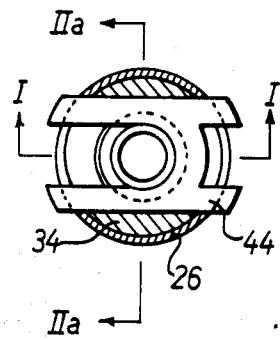
FIG. 2b is a sectional view of the part shown in FIG. 2a on the line IIb—IIb of the latter figure.

At the end (right hand end of FIG. 1) of the output rod 28 opposite to that which operates the master cylinder piston (not shown) there is provided a yoke 36. A first pair of levers 38 is pivotally coupled about a pin 40 which is disposed transversely to the guide tube axis, the levers 38 also extending generally transversely of the guide tube axis as shown in FIG. 2a and passing laterally through circular apertures 39,37 in the cylindrical wall of the guide tube 26, and in the arms of the yoke 36, respectively. The latter apertures are of sufficient size to permit unimpeded movement of the levers 38. Suitable bushings must be provided on the levers 38 to limit fretting. In this embodiment, the levers 38 each comprise a hard nylon tube reinforced internally with a steel pin.

The outer ends of pin 40 engage in respective apertures in the forward end of the input piston 34, which slides within the guide tube 26. A transversely extending key plate 44 is fixed relative to the guide tube 26 in suitably shaped slots therein and thereby forms an abutment which is engageable by the piston 34 for communicating movement of the input piston 34, beyond a predetermined initial movement, to the guide tube 26. The key plate 44 also serves to locate a tubular valve member 46 coaxially within the bore of the piston 34. Between the forward end of the valve member 46 and the inner bore of the piston 34 there is a rolling diaphragm seal 48, the rearward end of the valve member 46 forming an annular valve seat 50. A further, rearwardly facing annular valve seat 52 is formed on the forward end of the input piston 34, the latter valve seat being normally engaged, in the inoperative state of the booster (FIG. 1), by a valve closure plate 54 which is resiliently biassed towards the seat 52 by means of a coil spring 56.

Figure 3:
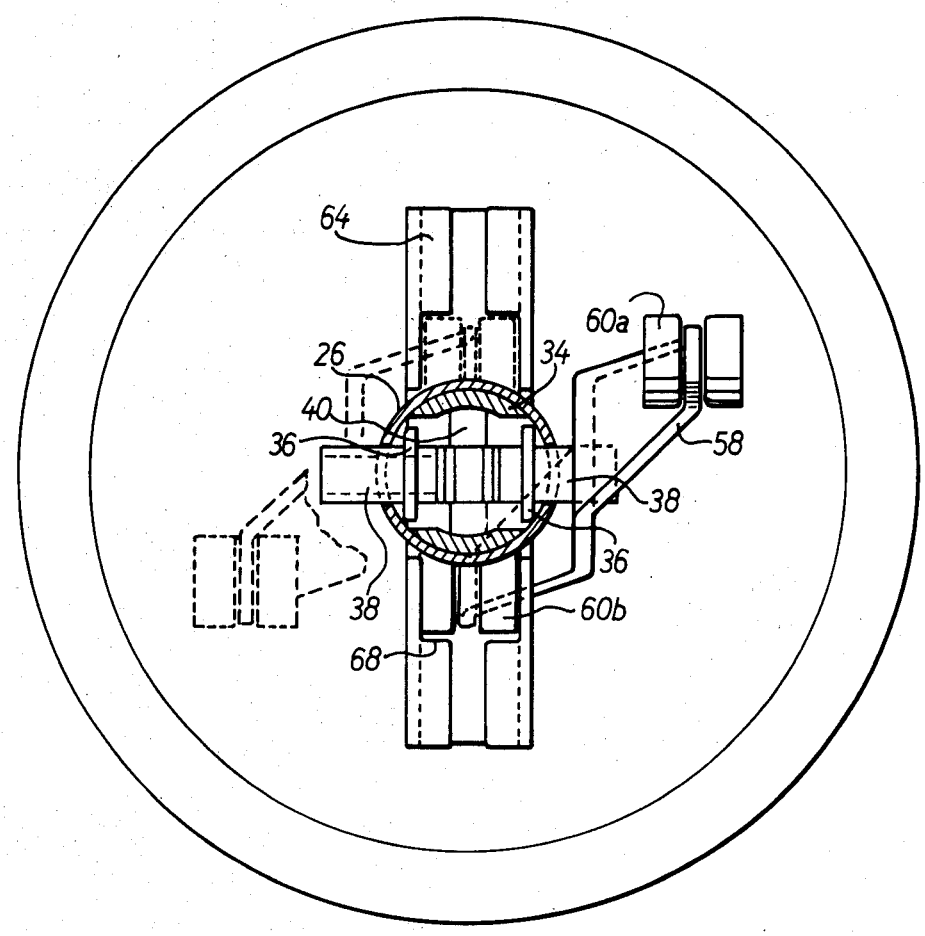
FIG. 3 is a diagrammatic partial sectional elevation on the line III—III of FIG. 1.
Figure 4:
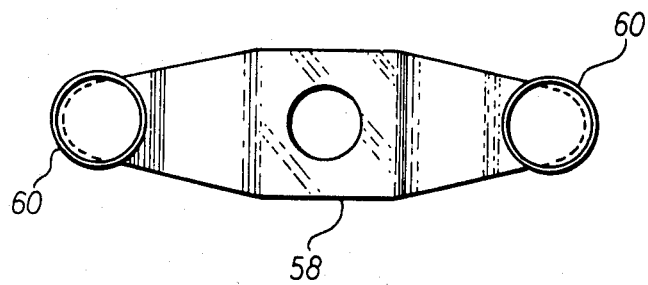
FIG. 4 is a front view of one of the levers of the embodiment of FIGS. 1 to 3.
Figure 5:
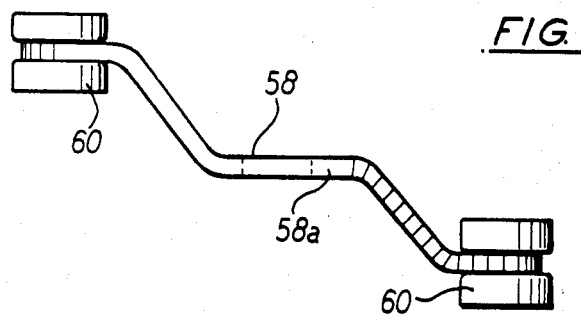
FIG. 5 is a plan view of the lever of FIG. 4.

Attached to the outer ends of the first levers 38 is a second pair of levers 58, which are used for transmitting load from the main piston 20 to the output push rod 28, the attachment being made at a location intermediate the length of the levers 58. Respective pairs of rollers 60 are mounted on each end of the levers 58. One such lever 58 is shown in more detail in FIGS. 4 and 5. The levers 58 are each shaped (see FIG. 5) such that, although having parallel rotational axes, the two pairs of rollers 60 carried thereby are both laterally offset from a central portion 58a of the lever whereby when the two levers 58 are mounted in their operational positions on the first levers 38 the arrangement shown in FIG. 3 is achieved. This arrangement is such that, as illustrated diagrammatically in FIG. 1, the rollers 60a on the one end of each lever 58 rest against the forward facing (left-hand)surface 62 of the main piston 20 and the rollers 60b on the other end of each lever 58 can engage the extreme left hand inner wall of the housing shell 12. The preferred embodiment illustrated includes a track 64 in which the rollers 60b may run during operation of the booster as described below. For the sake of clarity, only one of the levers 58 is shown diagrammatically in FIG. 1, although of course, there are two such levers in this embodiment as shown in FIG. 3, whereby the piston 20 can be loaded in a substantially balanced manner about the guide tube 26.

The operation of the aforegoing booster is as follows. When the driver of a vehicle, in which the booster is installed, depresses the brake pedal, which is linked to the input rod 32, the input piston 34 moves to the left with the rod 32 but without corresponding movement of the guide tube 26 so that the closure member 54 engages the valve seat 50, thereby cutting off a vacuum supply to the rearward chamber 24 that had previously existed via a vacuum connection (not shown) on the housing shell 12, the chamber 22, the internal bores in the piston 34 and valve member 46, and holes in the key plate 44. At the same time, the movement of the piston 34 serves to pivot the two levers 38 into their working position in which they are substantially aligned in a straight line. Further leftward movement of the input rod 32 and piston 34 causes the valve seat 52 to move away from the closure member 54, which is held by the valve seat 50, thereby admitting pressure fluid (i.e. air at atmospheric pressure) to the chamber 24 via a filter member 64 and the interior bore of the piston 34. The resulting pressure differential across the movable wall assembly, comprised by the piston 20 and rolling diaphragm 18, causes the piston 20 to be displaced to the left. Continued increase in input thrust at the rod 32 causes the piston 20 to move progressively leftwards and, in so doing, the levers 58 are urged leftwardly and also rotated about their attachment points (diagrammatically indicated at 66 in FIG. 1) with the outer ends of the levers 38 whereby the levers 58 progressively move through the attitudes of inclination diagrammatically indicated at A, B, C and D in FIG. 1.

It will be noted that initially the left hand rollers 60b are spaced from the lefthand wall of the housing 12, and rest on the end 68 of the guide track 64 so that the levers 58 move leftwardly without rotation for a distance corresponding to the radius of the rollers 60b. The boost level at this stage is minimal. When the rollers 60b enter the guide track 64, the levers 58 tend to rotate about these rollers which now form fulcrums. Output thrust is transmitted to the output rod 28 by virtue of the displacement force of the piston being communicated, with mechanical advantage due to the lever ratio, via the levers 58 and the connected levers 38 which respectively engage the peripheries of the apertures 37 formed in the yoke 36. It will be apparent from FIG. 2a that the effect of the levers 58 is to apply to the ends of the levers 38 forces in the direction of arrows X, X'. If for the moment one considers the pin 40 to be a fixed fulcrum point for both levers 38, it is apparent that the latter levers apply to the output rod forces in the direction Y, Y' at their points of engagement with the apertures 37 in the yoke 36. The pin 40 is not actually a fixed point, however, but is attached to the input rod via the input pistons 34 so that the levers 38 exert forces in the directions ZZ' on the input piston 34 which are transferred to the input rod 32 and felt by the operation as brake "reaction". The function of the levers 38 is thus two fold in that firstly they transfer the boosted force from the levers 58 to the output rod 28 via the yoke 36 and secondly they provide a direct reaction feedback to the input piston and input rod 32 so that the valve opening is regulated to give only the required output load and this servo is thus of the "output-reactive" type. A helical return spring (not shown) acts between the lefthand inner wall of the housing shell 12 and the piston 20, there being sufficient clearance within the return spring coils to permit the operational movement of the levers 58.

The transversely extending key plate 44 acts as a return stop for the piston 20, and also acts to transmit input load "push-through" in the event of vacuum failure whereby sufficient braking force is still obtained, albeit without servo boost.

Although a light spring 56 is used to maintain the valve closure member 54 in position, in the preferred arrangement illustrated, atmospheric air pressure acts to urge the closure member 54 towards the valve seat 52. If used as an air-suspended servo, the pressure fluid supply would act in exactly the same manner as the atmospheric air pressure in the vacuum suspended case illustrated. In the vacuum-failed condition, the valve closure member can lift against the light load of the bias spring 56 to release trapped air in the chambers 22,24.

The boost ratio of the above described unit is determined primarily by the spacing of the arms of the yoke 36 and the drag centre of the levers 58. Fine adjustment of the boost ratio can be simply a matter of selecting different spacing washers (not shown) which set the precise axial location of the levers 58 relative to the levers 38 and thus the location at which the levers 58 are effective to apply their forces to the levers 38.

A convenient but not essential feature of the described unit is the positioning of the corner 68 of the track 64 such that the associated rollers 66b roll over this edge 68 to provide a variable mechanical advantage for the levers 58.

From the aforegoing description, it will be appreciated that initial movement of the input rod 32 and piston 34, and indeed initial movement of the piston 20, does not produce an immediately boosted output. The output rod 28, however, has a maximum boosted output force directly dependent on the area of piston 20. This conforms to the typical requirement of a practical braking system that it needs movement at low effort to take up clearances and that high output effort should not occur in the initial input travel period.

In the alternative arrangement illustrated diagrammatically in FIGS. 6 and 7, the levers 58 are substantially Y-shaped and carry respective pairs of rollers 60 at each of their three ends. This enables a more stable arrangement to be obtained which ensures that the piston 20 is uniformly loaded about the guide tube 26. Torsional loads at the levers 38 are also minimised.

As shown in FIG. 6 one of the Y-shaped levers carries a single pair of forward rollers $60'b$ and two pairs of rearward rollers $60'a$ and the other such lever carries one pair of forward rollers $60''b$ and two pairs of rearward rollers $60''a$.

Alternatively, if a third track is provided it can be arranged for the other lever to carry two pairs of forward rollers $60''b$ to engage two of the tracks on the housing and one pair of rearward rollers $60''a$ to be engaged by the movable wall.

I claim:

1. A servo booster for a vehicle brake system of the type having a housing, a movable wall located within said housing and dividing said housing into two chambers, an input member operably coupled to an actuating pedal and adapted to control the differential pressure across the movable wall, an output member operably associated with said movable wall and axially displaceable by said movable wall through a lever mechanism, said lever mechanism comprising:
    (a) at least one first lever;
    (b) one end of said first lever being in engagement with a part fixed relative to said housing;
    (c) the other end of said first lever being in abutting engagement with said movable wall;
    (d) said first lever providing a mechanical advantage between the displacement of the movable wall and the resulting displacement of the output member;
    (e) at least one second lever;
    (f) means pivotally connecting said second lever to said input member;
    (g) means defining a pivotal engagement between said second lever and said output member; and
    (h) pivotal support means on said second lever for said first lever;
said pivotal connection, engagement and support means of said second lever with said input and output members and with said first lever, respectively, being arranged that said second lever firstly transmits displacement of the first lever, in response to movement of said movable wall, to the output member and secondly transmits a reaction force to the input member.

2. A servo booster according to claim 1 in which said first lever is substantially Y-shaped to reduce torsional loads on said second lever.

3. A servo booster according to claim 1 in which two said second levers are provided and arranged to be diametrically opposing with respect to one another whereby substantially uniform loading on the output member is attained.

4. A servo booster according to claim 3 in which two complementarily arranged first levers are provided, whereby the reaction forces applied to the input member by said second levers are substantially balanced.

5. A servo booster according to claim 1 in which said means pivotally connecting the second lever to the input member comprises a pin pivotally securing one end of the lever to the input member, the pivotal support means for the first lever comprises the other end of said second lever about which said first lever pivots, and the means defining the pivotal engagement between said second lever and said output member comprises abutting engagement of said second lever with said output member at a location intermediate the ends of said second lever.

6. A servo booster according to claim 1 or 5 in which said mechanical advantage provided by said first lever is variable, at least over a portion of the travel of the movable wall.

7. A servo booster according to claim 6 including at least one roller provided on the end of said first lever cooperating with said part fixed to the housing, said roller being arranged to roll over said part in such a way as to obtain said variation in mechanical advantage of said first lever.

8. A servo booster according to claim 7 in which said part fixed to the housing includes a track member which is engaged by said roller provided on said end of said first lever, the roller abutting an edge of said track member during said initial input member travel, whence the radial spacing of the roller from the axis of the output member is maintained substantially constant during the initial travel of the movable wall and the first lever is prevented from pivoting, but when said roller enters the track member, said radial spacing is allowed to increase and hence the first lever to pivot whereby said mechanical advantage is provided and progressively increases.

9. A servo booster for a vehicle brake system in which an output member is axially displaceable by the application of differential fluid pressure, under the control of a valve operable by an input member, across a movable internal wall dividing a housing of the booster into a pair of fluid chambers, displacement of the movable wall being communicated to the output member via a lever mechanism providing a mechanical advantage between said movable wall and the output member, said lever mechanism comprises:
    a pair of first levers whose one ends engage the movable wall and whose other ends engage parts fixed in relation to the housing; and
    a pair of second levers whose one ends are pivotably connected to the input member and whose other ends respectively provide pivot points for said first levers, said second levers abutting the output member at respective locations intermediate the ends of said second lever;
    said first and second levers, pivotal connections and abutment being constructed and arranged that on displacement of said movable wall, said first levers are pivoted and their displacement transmitted with mechanical advantage to said second levers so that the latter firstly transmit said displacement to said output member and, secondly, transmit reaction forces to said input member.

10. A servo booster according to claim 9 in which said one ends of said second levers are commonly pivotably coupled to the input member by means of a single pin member which extends transversely to the input and output members and is fixed relative to the input member.

* * * * *